Dec. 19, 1967    C. L. LANDES    3,359,497
SYSTEM FOR GATING OUT CONTENTS OF SHIFT REGISTER IN RESPONSE
TO PRESENCE OF PULSES IN SELECTED STAGES THEREOF
Filed March 3, 1964    3 Sheets-Sheet 1

CLAUDE L. LANDES
INVENTOR.

By: Karl G. Ross
AGENT

United States Patent Office 3,359,497
Patented Dec. 19, 1967

3,359,497
SYSTEM FOR GATING OUT CONTENTS OF SHIFT REGISTER IN RESPONSE TO PRESENCE OF PULSES IN SELECTED STAGES THEREOF
Claude L. Landes, Montreuil, Bois, Hauts-de-Seine, France, assignor to Societe Nouvelle d'Electronique et de la Radio-Industrie, a corporation of France
Filed Mar. 3, 1964, Ser. No. 348,925
Claims priority, application France, Mar. 5, 1963, 926,886, Patent 1,358,554
12 Claims. (Cl. 325—322)

ABSTRACT OF THE DISCLOSURE

A system for decoding secondary-radar response codes in the form of position-modulated pulse-code groups each including a pair of framing pulses bracketing the group, wherein a digital shift register 50 replaces the prior-art delay line. Received code groups are applied through an AND-gate 4 to the register input while shift pulses are applied to the register stages by an oscillator 2 which is started when a bistable device 1 is set by the initially received pulse; a counter 3 resets the binary and stops the oscillator after reception of the prescribed number of pulses comprising a complete code group. If the received code group includes framing pulses at the prescribed positions the corresponding stages of the register actuate a coincidence gate 8 whereby the code group is transferred through a gating device 6 into an output register 7 (see FIG. 3). Means are further disclosed for separating garbled response codes from different aircraft in certain garbling situations.

---

This invention relates to devices for decoding pulse-modulated codes of the type used e.g. in radio communications with air- and space-craft and for similar purposes.

One important use of the decoders of the present invention is in connection with secondary radar systems, and this particular application of the invention will be more especially referred to hereinafter for convenience but such references should not be construed as imposing limits on the scope of the invention.

To grasp the characteristics of a secondary radar system it should be understood that a conventional radar system is inherently capable of providing only a limited amount of information concerning craft detected by it, such information being basically restricted to distance, flight direction and velocity.

The constant increase of air traffic has aroused the need for systems capable of imparting more specific information about craft present in a given air space e.g. in the vicinity of an important airfield, including in particular the identity of the detected craft, its altitude, as well as other data. The so-called "secondary" radars have been developed in recent years to meet this need.

Essentially a secondary radar system comprises means for transmitting interrogating modes in the form of position-modulated pulse codes to an aircraft generally detected by a conventional or primary radar system synchronized therewith, and the aircraft is provided with transponder or equivalent means which respond to such interrogation-mode signals by transmitting back to the interrogating station a pulse-modulated code containing the particular information specified in the interrogating signal. The received code signals are then processed at the interrogating station or at a station linked therewith in order to extract the information content thereof in the form of video signals for display on a PPI screen and/or for some other use.

The decoder section of such a secondary radar system, with which this invention is more especially concerned, is usually provided in the form of a delay line through which the pulse codes constituting the response from a particular aircraft are passed serially. Such response codes all include a common predetermined number of pulse positions including a pair of fixed positions, such as the first and last positions of the code, which always contain a pair of so-called "framing" or "bracket" pulses therein, the presence of these framing or bracket pulses at the prescribed fixed spacing constituting the test showing that the code being received is actually a secondary radar response rather than some stray signal which happens to have the same carrier frequency. Inbetween these pulses (and occasionally beyond the second of these pulses as will later appear) there may be a variable number of variably positioned pulses which constitute the coded response information itself.

The afore-mentioned decoding delay line is of a length sufficient to contain all such code pulses simultaneously and is provided with spaced taps positioned to correspond with the pulse positions of the code. Two of these taps, whose positions are selected to correspond with the pulse positions containing the framing or bracket pulses in the code, are connected to the inputs of a coincidence gate or AND-gate. When both these inputs are simultaneously energized, the gate produces an output which causes parallel transfer of the contents of the delay line through all the afore-mentioned taps to an output device, e.g. buffer.

In conventional pulse decoders of this type, the delay lines were usually analog in character, e.g. magnetostrictive or electric networks. It is found difficult to produce delay lines of this character possessing accurately predetermined uniform characteristics, and moreover such characteristics tend to change with time. As a consequence the performance of the decoder and that of the secondary radar system as a whole tended to be unreliable. It is an important object of this invention to eliminate this cause of unreliability in pulse decoders.

Another source of unreliability in conventional secondary radar systems has been due to interference between responses from different craft. Objects of this invention are to reduce this cause of error very considerably and to enable a pulse decoder system to distinguish between pulse codes emanating from different sources even in cases where the codes are substantially in-phase; to separate such codes of different origin in all cases where they are separable; and to reject one, or if absolutely necessary, both received codes if such separation cannot be made in order to avert the possibly serious consequences of garbled messages.

Examplary embodiments of the invention will now be described by way of illustration but not of limitation with reference to the accompanying drawing wherein:

FIG. 1 presents three diagrams (1a, 1b, 1c) illustrating respectively an isolated pulse code, two closely spaced codes and overlapping codes;

Figure 4:
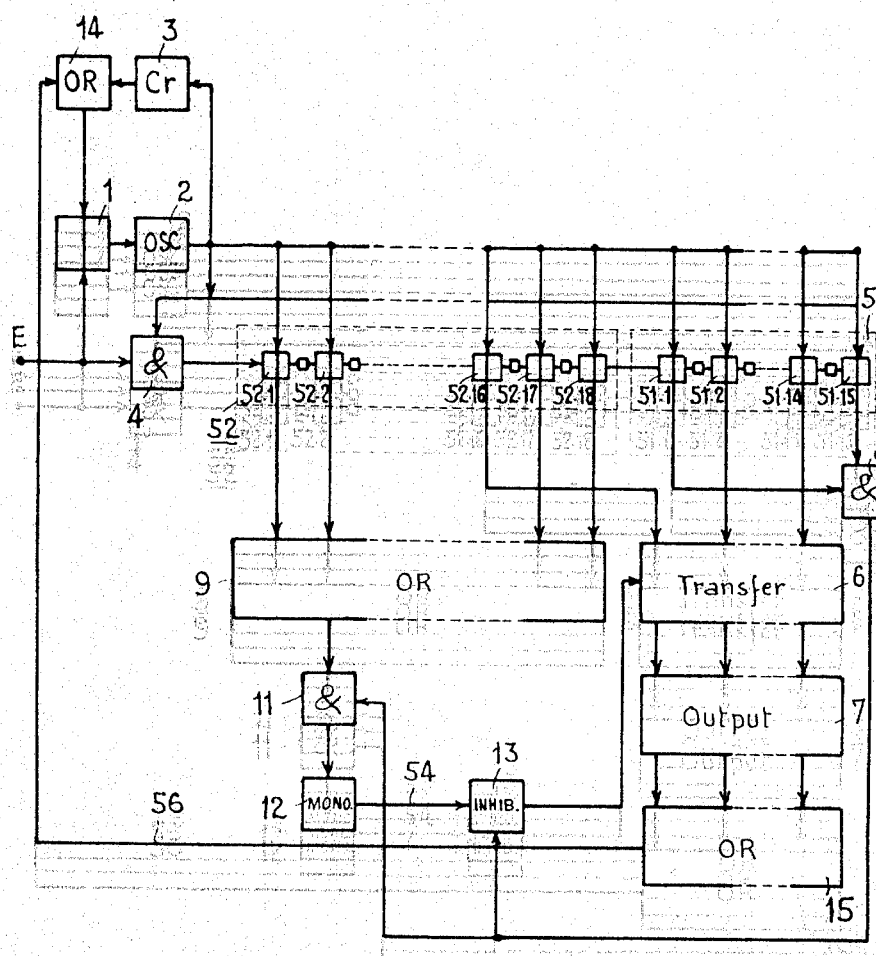
Figure 5:
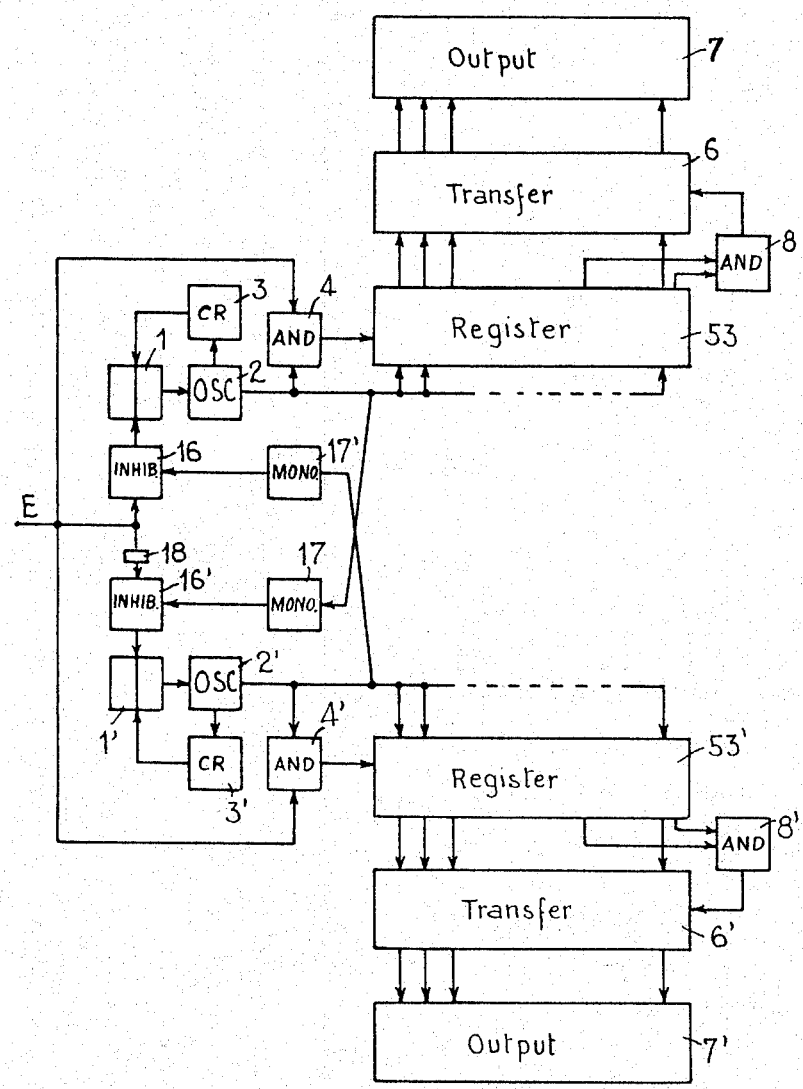

FIG. 4 similarly illustrates another embodiment of the invention using an extended digital register; and FIG. 5 shows another embodiment in the form of a two-channel digital register decoder.

Figure 1:
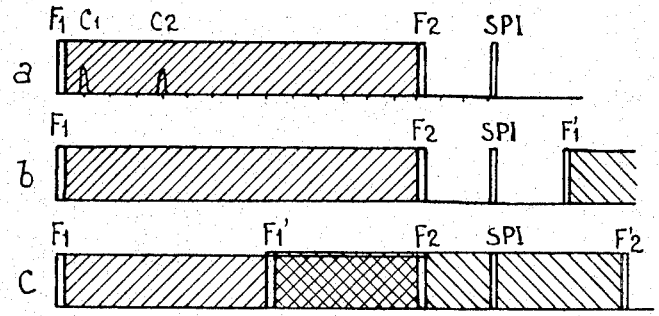

As represented in FIG. 1a, a typical response signal received by a secondary radar system from the transponder set of an aircraft in response to an interrogating mode signal transmitted to the craft, is shown as including a pair of so-called bracket or framing pulses F1 and F2, defining between them a fixed number of incremental pulse positions capable of constituting a pulse-modulated train. In one practical example the framing pulses F1, F2 may be spaced 20.3 microseconds apart and define therebetween thirteen incremental pulse positions spaced 1.45 microseconds apart, i.e. fourteen incremental spaces (20.3=1.45×14). The said pulse positions are occupied by a variable number of variably-positioned code pulse for conveying information transmitted from the craft, and as here shown there are two such code pulses C1 and C2, in the first and fourth pulse positions respectively for conveying certain specific information such as, say, the identity of the craft, in accordance with a predetermined code. Also shown by way of example is a so-called identification pulse SPI positioned three increments (4.35 μs.) after the second framing pulse F2, and indicating that the responding aircraft is a particular craft specified in the interrogating mode. It will be understood that the framing or bracket pulses F1 and F2 are always present in the response signals transmitted by an interrogated aircraft regardless of the positioning of the code pulses such as C1, C2, and the presence or absence of an identifying pulse such as SPI.

Figure 2:
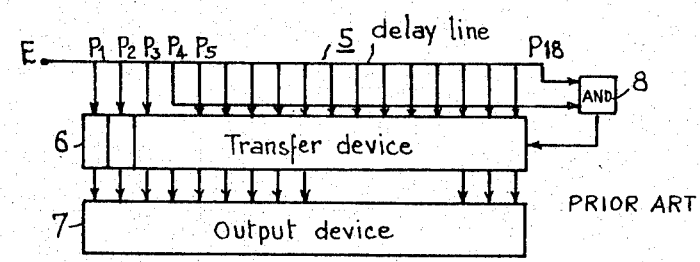
FIG. 2 is a block diagram illustrating the general principle of a delay-line pulse decoder.

FIGURE 2 illustrates the broad principle of a code-extractor or decoder device used to extract the information content from a response code signal such as that shown in FIG. 1a. In FIG. 2 the block 5 represents a delay line of any suitable character and of appropriate length, which in the present instance may correspond to seventeen pulse increments i.e. 1.45×17=24.65 μs., so as to allow for the simultaneous presence in said delay line of the entire pulse code defined between the framing pulses F1, F2, plus the identification pulse SPI if present. Output connections p1 through p18 are tapped from spaced points of the delay line 5 for sensing the signal pulses present thereat (it being noted that where there are 17 inter-pulse spaces there are 18 pulse positions). The taps p1 through p18 are connected to the inputs of a transfer unit 6 comprising a set of parallel gates, which are normally shut but are all simultaneously opened on application to the unit 6 of an enabling pulse derived from a coincidence or AND-gate 8. When the gates of transfer unit 6 are opened, the pulses present at that time in any of the code positions of delay line 5 are all transferred in parallel through taps p1–p18 and the gates of transfer unit 6 to an output register or memory unit 7 in which they may be stored, and/or used to produce a display on a PPI radar screen or otherwise. The AND-gate 8 has its two inputs connected to the output taps p4 and p18 of delay line 5, which taps as here shown are not connected to corresponding inputs of the transfer gates 6, since the display of the framing pulses F1, F2 would be superfluous, the AND-gate 8 giving the bracket decode (All C/S).

In the operation of the decoder device just described, which is generally conventional, response signals from a secondary radar receiver set (not shown) are fed to the input E of the delay line 5, and travel serially over the line. If, and only if, the received signal includes a pair of framing pulses such as F1 and F2 spaced apart the requisite amount, thereby indicating that the received pulses actually form part of a true response signal from an aircraft transponder, not spurious signals from some other source, the said framing pulses F1 and F2 reach the positions p18 and p4, respectively, of delay line 5, AND-gate 8 is rendered effective and transmits an enabling signal to the transfer unit 6. All the pulse contents in the received signal other than the framing pulses themselves are then simultaneously transmitted in parallel over the gates of unit 6 to the output unit 7.

In the known decoder system thus described the delay line 5 has heretofore generally been provided in the form of a continuous or analog delay line, such as an electric delay network, a magnetostrictive delay line or the like. Experience has shown that the resulting secondary radar systems are liable to provide erroneous indications especially after some operation period. It should be realized that an error of the order of 1/100 on the total delay time of the line is in many cases sufficient to result in the loss of information. Magnetostrictive delay lines are difficult to produce with accurately controllable time-lag characteristics. Moreover, such analog-type delay lines, including electrical delay networks, tend to age and their delay characteristics change with time.

In accordance with an important object of the present invention, the delay characteristics of a decoder system of the general type described above are rendered more positive, accurately controllable and unchanging with time and the reliability of the resulting system is thereby greatly enhanced. In this aspect of the invention, there is substituted for the delay line 5 in FIG. 2, a digital shift register together with timing means for applying accurately controlled shift pulses to the register to step the received code information therethrough.

Figure 3:
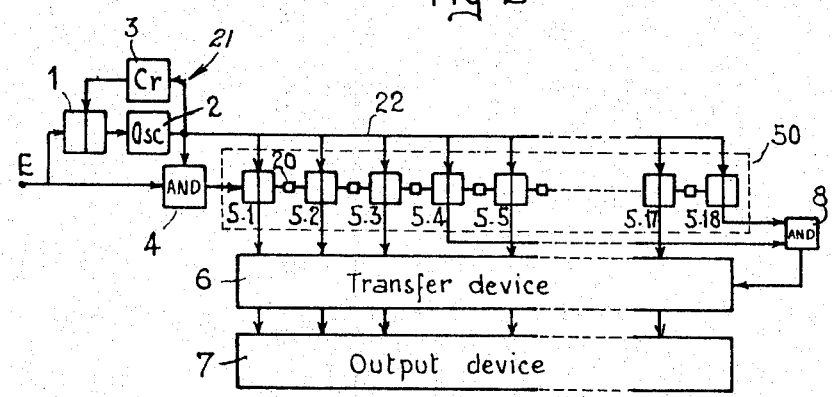
FIG. 3 is a block diagram of a digital-register-type pulse decoder according to a simple form of the invention.

In FIG. 3 which illustrates a basic embodiment of the invention in this one of its aspects, elements corresponding in function to elements of FIG. 2 are designated with similar reference numerals. As shown, the system includes a multistage shift register 50 as a substitute for the delay line 5. The shift register 50 comprises a number of stages, e.g. eighteen, each stage being in the form of a bistable element 5.1 through 5.18, and the stages are separated by delay elements such as 20. The bistable elements 5.1 through 5.18 may assume any suitable form, such as ferrite cores, semiconductor diodes, magnetizable film elements, or the like.

Associated with the shift register 50 is a timing and sampling unit 21 which has the main function of generating a train of isochronic timing pulses which are applied in parallel to the stages of register 50 in order to step the information through the register. As shown the timing unit 21 includes an oscillator 2 which is conveniently a ringing oscillator, i.e. is adapted to generate accurately timed pulses in fixed phase relationship with a sine wave of stabilized frequency. In this instance the time period between the leading edges of adjacent timing pulses produced by ringing generator 2 is the afore-mentioned incremental period 1.45 μs.

The timing pulses produced by generator 2 are applied in parallel over conductor 22 to the respective stages of the register 50 to cause the desired shifting action in the manner usual to such shift registers. The timing pulses are simultaneously applied to a pulse counter 3. On attaining a predetermined count, herein eighteen, counter 3 emits an output which is applied to one input of a bistable element or flipflop 1, switching this element to a reset condition. Element 1 has another or setting input, which is supplied with signals from the input E of the decoder system. When switched to its set state as by the leading wavefront of a framing signal F1, bistable element 1 produces an output which is applied to oscillator 2 in order to start it in operation. When reset, bistable element 1 delivers no output so that oscillator 2 is then idle. The input signals from system input E are also applied to a sampling circuit 4 which constitutes a coincidence or AND-gate provided with an enabling input from the ringing oscillator 2.

In the operation of this system, a signal train applied to the input E of the decoder from the receiver of the secondary radar system initially acts to switch flipflop 1 to its set state, causing the flipflop to emit an output which enables ringing oscillator 2. The oscilator then produces a train of isochronic timing pulses which are applied as shift pulses over conductor 22 to the stages of the shifting register 50 in parallel. The timing pulses are also applied to sampler AND-gate 4 so that each code pulse in the received signals following the initial framing pulse F1, is applied to the input of the shift register 50. At this point the operation of the improved decoder system is generally the same as that described in the case of FIG. 2. That is, as the first framing pulse F1 reaches the end stage 5.18 of the register, then if at the same instant a second framing pulse F2 is present in stage 5.4 of the register, indicating that the received signal train is a proper transponder code, AND-gate 8 is operated and delivers an enabling signal to the transfer unit 6, which thereupon causes the entire signal content of all the stages of the register 50 (except the frame pulses present in stages 5.4 and 5.18) to be simultaneously transferred in parallel to the output register or memory unit 7 for display and/or other exploitation.

After the oscillator 2 has produced the prescribed number of timing pulses, such as eighteen, counter 3 is actuated to emit a reset signal to the flipflop 1, which switches to its reset state and disables the oscillator 2. Thus the operation of the decoder is arrested until such time as the input E receives a further signal from the radar receiver.

In the operation of a secondary radar system, considerable difficulties are experienced due to the possibility that more than one aircraft positioned at the same distance and azimuth from the radar station but at different altitudes may transmit substantially simultaneous responses, resulting in garbled code messages. It is an important object of this invention to incorporate means in the decoder for guarding against such type of garbling and preventing erroneous display or other exploitation of such garbled responses while still deriving a maximum amount of useful information therefrom to the extent this is possible.

FIGURE 4 illustrates an improved decoder system according to the invention in which compontents equivalent in function to components of the first embodiment are similarly designated. This system includes two serially disposed shift registers, i.e. register 51 generally corresponding to register 50 of FIG. 3, and an additional shift register 52 interposed ahead of register 51. In the instant example the register 51 includes only fifteen stages 51.1 through 51.15 while the additional register 52 contains eighteen stages 52.1 through 52.18. Register 51 has its stages, other than 51.1 and 51.15, connected to the gate inputs of transfer device 6 as in FIG. 3, the gate outputs being again connected to the stages of a storage register 7. Stages 51.1 and 51.15 of register 51 are connected to the inputs of an AND-gate 8 as in FIG. 3. The output of AND-gate 8, instead of being applied to the enabling input of the transfer device 6 directly as in FIG. 3, is here connected to said enabling input by way of a gate 13 provided with an inhibiting input 54. The storage register 7 has its stages connected to the respective inputs of an OR-circuit 15. The output of OR-circuit 15 is connected to one input of an OR-circuit 14, having another input connected to the output of counter 3 actuated by ringing oscillator 2. The output of OR-circuit 14 is connected to the resetting input of flipflop 1, the setting input to which is provided by the input signals at the system input E. As in the preceding embodiment, flipflop 1 when set enables operation of the ringing oscillator 2, which then generates shift pulses applied in parallel to all the stages of both registers 52 and 51. The shift pulses are simultaneously applied to the counter 3 which, on attaining a prescribed count (herein 15+18=33 pulses), generates an output pulse which is applied to a second input of OR-circuit 14, and is passed through the OR-circuit to the resetting input of flipflop 1. The output from oscillator 2 is also applied to the input of sampler AND-gate 4 so as to sample the input signals from system input E at the instants determined by the timing pulses produced by the oscillator.

The stages of the additional shift register 52 (other than stage 52.16) are connected to the respective inputs of an OR-circuit 9. The output from this OR-circuit is applied to one input to an AND-circuit 11, having another input derived from the output of AND-circuit 8. The output from AND-circuit 11 is also applied to a monostable circuit or multivibrator 12, whose output provides the inhibiting input 54 to gate 13 previously referred to. As shown, stage 52.16 of register 52 is connected to the first input gate of transfer device 6.

The system operates as follows. It is first assumed that an isolated response message is applied to the system input E, that is to say a code message of the type shown in FIG. 1a not immediately followed by another code message within a time period less than 24.65 µs. (one full code period). The initial framing pulse F1 of the code applied to input E sets the flipflop 1 and starts the oscillator 2. The resulting timing pulses are applied to shift the signal pulses through register 52 and through register 51 continuously. So long as signal pulses are present in register 52 OR-circuit 9 produces an output which is applied to one input of AND-gate 11 but since the other input of AND-gate 11 is not energized the AND-gate produces no output. The code message thus traverses register 52 without further effect and enters register 51. When the first framing pulse F1 has reached the end stage 51.15 of this register and the second framing pulse F2 is simultaneously positioned in stage 51.1, AND-gate 8 produces an output. This output is applied to AND-gate 11 but since its first input is no longer energized AND-gate 11 produces no output, so that monostable device 12 also produces no output. The output from AND-gate 8 is also applied to gate 13 and, in the absence of an inhibiting input on line 54 from monostable device 12, the output signal from AND-gate 8 passes gate 13 unimpeded and is applied to the transfer device 6 causing parallel transfer of the coded-information content of register 51 into storage device 7. An identification pulse at stage 52.16 of additional register 52, if such pulse is present, is also transferred. Is soon as this transfer has been made OR-circuit 15 produces an output signal on line 56 and this signal by way of OR-gate 14 resets flipflop 1 to suspend the operation of the oscillator, until such time as a fresh signal is received at input E.

It should at this point be indicated that the interrogation signals transmitted by the secondary radar system and hence the response messages received from any single craft are arranged to be spaced by time lapses greater than the length of the response code messages (here 24.65 µs.) in order to preclude the occurrence of situations in which pulses pertaining to successive response codes might happend to be spaced apart an amount equal to the prescribed spacing between framing pulses F1, F2 of each response code and would thus be liable, on reaching the appropriate register stages to energize AND-gate 8 and cause an erroneous display. Hence, whenever the secondary radar receiver receives a pair of messages spaced less than the prescribed time lapse, as indicated for example in FIG. 1b, it signifies that the two responses come from different aircraft. The improved decoder described with reference to FIG. 4 is capable of discriminating between such closely-spaced response messages to avoid the garbling that might otherwise result if the simple decoder of FIG. 3 (or of course the conventional decoder of FIG. 2) were to be used. The decoder of FIG. 4 achieves this result by preventing the effective extraction of one or the other of the two adjacent messages as will now be described.

Consider first the case where the two closely spaced response codes, respectively framed by the framing pulses F1–F2 and F′1–F′2 happen to have pulse positions in phase as between the two codes. Then at the instant the framing pulses F1–F2 of the leading code are positioned in stages 51.15 and 51.1 of register 51, there is at least the initial framing pulse F′1 of the next succeeding code which is positioned at some stage of register 52. This stage thus energizes a corresponding input of OR-gate 9 and the resulting output from the OR-gate energizes an input of AND-gate 11. Since the other input of this AND-gate is also energized at this time from the AND-gate 8 as earlier described, gate 11 produces an output which causes monostable circuit 12 to emit an inhibiting signal over line 54 to gate 13 preventing transfer of the contents of register 51 to the output register 7. The leading code message therefore is not extracted. However, as the framing pulses F'1 and F'2 in turn reach the stages 51.15 and 51.1 of register 51, assuming of course this second code is not itself closely followed by a third response code, the system operates normally in the manner already described to extract the information from this second code and transfer it to output register 7.

If the two closely spaced response messages shown in FIG. 1b instead of having their respective pulse positions in phase as assumed in the foregoing paragraph have their pulse positions substantially out-of-phase with respect to each other, then a different situation obtains. When the leading code has its framing pulses F1 and F2 positioned in stages 51.15 and 51.1, none of the stages of register 52 has a pulse of the succeeding code positioned therein so that OR-gate 9 is not energized, AND-gate 11 is not energized and monostable device 12 does not feed an inhibiting pulse to gate 13, so that the transfer of the information contents in register 51 through gates 6 to output register 7 is normally effected. OR-gate 15 then produces an output over line 56 to OR-gate 14 thereby resetting flipflop 1 and arresting the operation of oscillator 2. In this situation it will be seen that only the first one of the two closely-spaced response messages is effectively decoded. In either case, i.e., whether the two closely-spaced messages arriving from different sources are in phase or out of phase, the decoder system of FIG. 4 has operated to prevent the simultaneous decoding of both messages and the garbling that would ensue, while ensuing correct decoding of one of the responses and thereby deriving the maximum useful result achievable from the situation.

A more serious form of garbling is liable to occur when responses from different aircraft transponders are received in over-lapping relation as indicated in FIG. 1c. If the two codes have their pulse positions in-phase, then it is clear that there can be no way of ascertaining which pulses belong to which code and both messages are hence useless. In this case, the decoder of FIG. 4 is arranged to reject both overlapping codes. The leading code (F1–F2) is rejected in the same manner as in the corresponding case described in connection with the closely-spaced messages of FIG. 1b, that is through the action of the decision circuitry including OR-circuit 9, AND-gate 11 and monostable device 12 which provides an inhibiting pulse to gate 13 to prevent transfer of the contents of register 51 through transfer device 6 to output storage device 7. The second code is in the present case also rejected by suitable logical means, which may reside in the simple provision that the inhibiting action of the aforementioned decision circuitry is arranged to continue a period corresponding to one code (e.g., 17 pulse space increments), or by other means. If the over-lappin gcodes are out-of-phase, then the operation is similar to that involving two closely-spaced responses in out-of-phase relation as earlier described, and only the leading code is extracted while the trailing code is rejected.

FIGURE 5 illustrates a two-channel decoder system according to the invention which is adapted, over and above the type of operation described with reference to FIG. 4, to decode and extract simultaneously two response codes received from different aircraft in a number of important situations in which one of such codes would otherwise have to be rejected.

The decoder of FIG. 5 includes two parallel channels each of which may be generally similar to the single-channel decoder of FIG. 3. In one of the two channels, that shown in the upper part of the drawing, components corresponding to components of the system of FIG. 3 (or FIG. 4) have been designated with the same reference numerals as in that figure, while the corresponding components of the other (lower) channel have been given the same reference numerals primed.

Each channel includes a multistage digital register schematically indicated as the block 53 (53') which may be similar to register 50 of FIG. 3, or preferably to the extended register 51–52 of FIG. 4. Stages of the register 53 (53') are connected by way of the gates of a transfer device 6 (6') to the respective stages of an output register or memory 7 (7'). An appropriately spaced pair of stages of register 53 (53'), spaced to have the framing pulses F1, F2 of a response code simultaneously positioned therein as earlier described, are connected to the inputs of an AND-gate 8 (8') whose output serves to open the gates of transfer device 6 (6').

With each of the registers 53 and 53' there is associated an individual timing-and-sampling circuit. This includes the oscillator 2 (2') which when actuated by a pulse from flipflop 1 (1') delivers timing pulses applied over line 22 (22') as shift pulses to the stages of register 53 (53') in parallel. The timing pulses are also applied to a pulse counter 3 (3') which is able to reset the flipflop 1 (1') after a predetermined count. The timing pulses are further applied to one input of a sampling AND-gate 4 (4') whose other input is fed with the signal pulses from the common input E of the decoder system, while the output from sampler gate 4 (4') is applied to the initial stage of register 53 (53') to be serially stepped through the register by the shift pulses.

Crossfeed interlock connections are provided between the two channels of the system, as follows. The timing pulse output from each oscillator 2, 2' is connected to the input of monostable circuit respectively 17', 17. The output from each monostable circuit 17', 17 is applied to one input of an inhibiting gate 16', 16 the output of which is connected to the reset input of flipflop 1', 1. Gates 16, 16' have their inhibitor inputs fed with signal pulses from the system input E, there being a delay network 18 interposed in the connection from the system input E to the gate 16'.

In operation, first assume that an isolated response message (FIG. 1a) is received at the input E of the system. The initial pulse F1 of the code is passed through gate 16, at this time uninhibited, sets the flipflop 1 and starts oscillator 2 in action. The upper channel of the system is thus set into operation in a manner essentially similar to what was described with reference to FIG. 3 to decode and transfer the information in the response code into the related output memory 7. The detailed operating sequence need not be again described at this stage.

However, the initial timing pulse from oscillator 2 is applied through the crossfeed connection described to the monostable device 17' which then emits an inhibiting pulse to gate 16' preventing the feed of the input pulses therethrough to the setting input of flipflop 1' which therefore remains reset and the related oscillator 2' remains idle. Thus the lower channel of the system is now inactive. The function of delay device 18, as will be evident, is to introduce the necessary lag into the response of one of the two channels, herein the lower channel, to prevent its operating simultaneously with the other channel in the event of in-phasei nput signals. The isolated response code is thus recorded in the upper output device 7 only.

Assume next that two response codes are received from different aircraft in substantially phase-displaced or phase-opposed relation. The two response codes may be separate and closely-spaced as in FIG. 1b or overlapping as in FIG. 1c. In either case the leading code will be processed in the upper channel and recorded in output memory 7 as in the foregoing case. The timing pulses from oscillator 2 will again actuate monostable device 17 and the resulting inhibiting pulses applied to gate 16' will momentarily close this gate as in the first case described. However the time constant of monostable device 17 (and 17') is so predetermined (e.g. on the order of 0.5 μs. in the instant example) with regard to the time constant of delay device 18 and other circuit constants, that the inhibiting action on gate 16' is terminated by the time the phase-displaced framing pulse F'1 of the trailing signal reaches the gate 16' so that said framing pulse is able to pass the gate, set flipflop 1' and actuate oscillator 2'. Thereupon the lower channel of the system will operate to process and record in memory 7' the code content of said trailing response signal. Thus both response messages received by the secondary radar station from different aircraft will be separately recorded in devices 7 and 7' and can be individually displayed and/or otherwise processed.

It will be understood that there are situations where the relationship between the two response codes received at input E is such that the decoder of FIG. 5 is unable to record both codes, and will be forced to reject one or both as did the decoder of FIGURE 4. Thus where both codes are overlapping (FIG. 1c) and in-phase, both codes are necessarily rejected since they are totally inseparable as explained earlier. Where the codes are in overlapping relation but their mutual phase displacement does not fall within the range permitting effective separation by the process described in the immediately foregoing paragraph, one or the other of the two codes will be rejected and the remaining code will be processed and retained in the upper on the lower channel depending on the phase relationship. In all-round operation the two-channel decoder here disclosed is found to enhance considerably the usefulness of a secondary radar system in that it enables response information to be decoded and effectively used under a great many circumstances where such information would have to be considered hopelessly garbled and hence rejected if a conventional decoder were being used.

It will thus be seen that the invention has provided improvements in decoder systems for pulse codes which is of especial value in connection with secondary radar systems but will be more generally useful in the field of communications wherever pulse modulated codes are used, as in telemetry, communication with and control of artificial satellites and spacecraft, and similar systems.

A great many modifications may be introduced into the exemplary systems schematically illustrated herein without exceeding the scope of the invention. Thus the logical circuitry can be altered considerably without affecting the essential operation of the systems.

What I claim is:

1. In a system for decoding pulse-modulated code groups each including a pair of framing pulses spaced a prescribed number of pulse positions apart, a code-checking arrangement comprising multistage digital shift-register means, means generating timing pulses, means applying said timing pulses as shift pulses to the stages of the register means, a system input receiving said modulated code groups, means applying the pulses of the code groups serially to an initial stage of the register means to be shifted therethrough by said shift pulses, an output device, and gating means connected to a pair of stages of the register means spaced correspondingly to the prescribed spacing of said framing pulses and responsive to the simultaneous presence of a pair of pulses of the code group in said pair of spaced stages for tranferring the pulse code from the register means to said output device whereby only code groups having said framing pulses are transferred to said output device while other code groups are rejected.

2. The system defined in claim 1 wherein the means applying the code pulses comprises a sampling coincidence gate having one input connected to receive said code pulses and another input connected to receive said timing pulses and having its output connected to said initial stage of said register means.

3. The system defined in claim 1 including means connected to said system input and responsive to an initial code pulse received thereat for initiating the application of said pulses to said register means.

4. In a pulse-modulated code system for decoding pulse-modulated code groups each including a pair of framing pulses spaced a prescribed number of pulse positions apart, a code-checking arrangement comprising a system input for receiving said modulated code groups, multistage digital shift-register means, a source of timing pulses, means for applying said timing pulses as shift pulses to the shift-register means, means for applying said code pulses serially to an initial stage of the shift-register means to be shifted therethrough by said shift pulses, means responsive to an initial pulse of a code group received at said input for initiating the application of the pulses thereof to the shift-register means, a multistage output register, parallel transfer gating means having inputs connected to the stage outputs of the shift-register means and having outputs connected to respective stage inputs of said output register, said gating means having an enabling input, and a coincidence gate having inputs connected to selected stages of the shift-register means at spaced-apart positions corresponding to the spaced-apart positions of the framing pulses of a code group and responsive to the simultaneous presence of pulses in said spaced-apart stages for transferring the code contents of the shift-register means into said output register whereby only code groups having said framing pulses are transferred to said output register while other code groups are rejected.

5. A pulse-code decoder system comprising a system input for receiving modulated pulse codes each code including a fixed number of pulse positions and framing pulses at fixed ones of said positions, multistage digital shift register means having a number of stages substantially greater than said number of pulse positions in a code, a source of timing pulses, means for applying said timing pulses as shift pulses to the stages of the register means, means for applying said code pulses serially to an initial stage of the register means to be shifted therethrough by said shift pulses, an output device first logical means connected to selected stages of the register means spaced a number of stages apart corresponding to the time spacing between said framing pulses and responsive to the simultaneous presence of framing pulses in said selected stages for transferring the code contents of the register into said output device, and second logical means connected to remaining register stages ahead of said selected stages and responsive to the presence of a pulse in any of said remaining stages simultaneously with the presence of said framing pulses in said selected stages, to prevent said transfer.

6. The system defined in claim 5, including means responsive to the transfer of said code contents into the output device for arresting the application of pulses to the register means.

7. A pulse-code decoder system comprising a system input for receiving modulated pulse codes each code including a pair of framing pulses at fixed positions therein; a first and second multistage digital shift register means; means producing timing pulses; means for applying said timing pulses as shift pulses to each register means; means for applying said code pulses serially to an initial stage of each register means to be shifted therethrough; an output device associated with each register means; logical means connected to selected stages of each register means and responsive to the simultaneous presence of framing pulses therein for transferring the code contents of said register means into the associated output device; and means connected to said system input and responsive to the phase relationship of the code pulses received thereat as compared to an initially received code pulse for directing subsequent code pulses having a similar phase relationship into one of said register means and code pulses having a displaced phase relationship into the other register means.

8. The system defined in claim 7, including means responsive to the application of code pulses to one of said register means for preventing the application to the other register means of code pulses phase-displaced by less than a predetermined amount from said first code pulses.

9. The system defined in claim 7, wherein each of said register means includes a plurality of stages ahead of said selected stages and there are provided further logical means connected to said plurality of stages of each register means and responsive to the presence of a code pulse therein simultaneously with the presence of said framing pulses in the selected stages of said register means to prevent the transfer of the pulse code to the associated output device.

10. A pulse-modulated code decoder system comprising multistage digital shift-register means, means generating timing pulses, means applying said timing pulses as shift pulses to the stages of the shift-register means, a system input receiving modulated code-pulse groups each including a pair of framing pulses therein, means applying the code pulses of the group serially to an initial stage of the register means to be shifted therethrough by said shift pulses, an output device, logical means connected to selected stages of the register means and responsive to the simultaneous presence of said framing pulses in said selected stages for transferring the pulse code from the shift-register means to the output device, means connected to said system input responsive to an initial code pulse received thereat for initiating the application of said pulses to said register means, and counter means connected to receive said timing pulses and responsive to a predetermined count to arrest the application of said pulses to the shift-register means.

11. The system defined in claim 10 which comprises an oscillator for generating said timing pulses, a two-state element having an output connected to an input of the oscillator for enabling operation of the oscillator in a set state of said element and disabling said operation in a reset state thereof, said element having a setting input connected to receive said code pulses and a resetting input connected to the output of said counter.

12. A pulse code decoder system comprising a system input for receiving modulated pulse codes each code including a pair of framing pulses at fixed positions therein, multistage digital shift-register means, a source of timing pulses, means for applying timing pulses as shift pulses to the shift-register means, means for applying said code pulses serially to an initial stage of the shift-register means to be stepped therethrough by said shift pulses, means responsive to an initial pulse of a code received at said input for initiating the application of said pulses to the register means, an output device, logical means connected to selected stages of the shift-register means and responsive to the simultaneous presence of said framing pulses in said selected stages for transferring the code contents of the shift-register means into said output device, and means connected for operation on completion of a transferring operation by said logical means to arrest the application of said pulses to the shift-register means.

References Cited

UNITED STATES PATENTS 2,870,429    1/1959    Hales _____ 340—167 X
3,274,503    9/1966    Peterson et al. _____ 325—325 X ROBERT L. GRIFFIN, *Acting Primary Examiner.*

JOHN W. CALDWELL, DAVID G. REDINBAUGH, *Examiners.*

J. T. STRATMAN, *Assistant Examiner.*